United States Patent [19]

Fevrier et al.

[11] Patent Number: 5,290,103
[45] Date of Patent: Mar. 1, 1994

[54] OPTICAL FIBER TEMPERATURE SENSOR

[75] Inventors: Hervé Fevrier, Massy; Jean-Francois Marcerou, Courcouronnes; Jean Hervo, Draveil; Serge Artigaud, Grigny, all of France

[73] Assignee: GEC Alsthom SA, Paris, France

[21] Appl. No.: 976,317

[22] Filed: Nov. 13, 1992

[30] Foreign Application Priority Data

Nov. 15, 1991 [FR] France ............... 91 14092

[51] Int. Cl.⁵ .............. G01J 5/08; G01K 11/00
[52] U.S. Cl. ................. 374/131; 250/227.11; 385/12; 374/161
[58] Field of Search ........ 374/131, 161, 130; 356/44; 359/341; 385/12

[56] References Cited

U.S. PATENT DOCUMENTS

| | | | |
|---|---|---|---|
| 4,002,975 | 1/1977 | Erickson et al. | 374/130 X |
| 4,136,566 | 1/1979 | Christensen | 374/161 |
| 4,542,987 | 9/1985 | Hirschfeld | 356/44 |
| 4,708,494 | 11/1987 | Kleinerman | 374/131 X |
| 4,785,174 | 11/1988 | Hodges et al. | 374/131 X |
| 4,906,106 | 3/1990 | Kaufmann et al. | 374/131 |
| 4,986,671 | 1/1991 | Sun et al. | 374/131 |

FOREIGN PATENT DOCUMENTS

WO-A8904502 5/1989 PCT Int'l Appl. .

OTHER PUBLICATIONS

Journal of Lightwave Technology, vol. 9, No. 2, February 1991, New York, US, pp. 261–265; Nobuyuki Kagi E. A.: "Temperature Dependence Of The Gain In Erbium–Doped Fibers".

Primary Examiner—Daniel M. Yasich
Attorney, Agent, or Firm—Sughrue, Mion, Zinn, Macpeak & Seas

[57] ABSTRACT

An optical fiber temperature sensor including an optical fiber (1) which has a mirror (3) at its end, and which is associated with temperature-sensitive means, means for launching a signal into said fiber and means for receiving the signal reflected by said mirror back along the fiber, said temperature-sensitive means being a section of amplifying optical fiber (10) bonded to said optical fiber (1), cooperating with a light pump source, and doped with a chosen rare-earth element.

5 Claims, 1 Drawing Sheet

OPTICAL FIBER TEMPERATURE SENSOR

The present invention relates to an optical fiber temperature sensor.

The most common examples of such sensors are extrinsic-type sensors in which the temperature-sensitive means are distinct from the optical fiber itself. Basically, such an extrinsic sensor includes two sections of fiber fixed together by glueing by means of a polymer material having a refractive index that varies as a function of temperature and that is close to the core index of the fiber. The drawback with such a polymer is that it limits the operating temperature of the sensor to about 120° C.

There are also intrinsic-type temperature sensors in which the temperature-sensitive means are the fiber itself. In a known example of such an intrinsic sensor, the Raman effect is used in the fiber, but such a sensor supplies a signal that is too weak to be used easily.

An object of the present invention is to provide an intrinsic-type optical fiber temperature sensor which has good sensitivity, which is capable of supplying a much higher power signal than the signals emitted by prior sensors, and which can withstand the same environmental conditions as conventional optical fibers.

The invention provides an optical fiber temperature sensor including an optical fiber which has a mirror at its end, and which is associated with temperature-sensitive means, means for launching a signal into said fiber and means for receiving the signal reflected by said mirror back along the fiber, said temperature-sensitive means being a section of amplifying optical fiber bonded to said optical fiber, cooperating with a light pump source, and doped with a rare-earth element chosen from erbium, ytterbium, praseodymium, thulium, and holmium.

By optimizing the length and the rare-earth concentration of said section of amplifying fiber, it is possible to adjust the sensitivity of the sensor.

The most suitable length for the section of amplifying fiber and the most suitable rare-earth content are chosen depending on the type of sensor that is to be made: an alarm sensor for locating a point liable to be subjected to a large variation in temperature; or a sensor giving the mean temperature over a determined distance. Said length may vary in the range 10 cm to 1 km, for example.

When the section of amplifying fiber is doped with erbium, the doping concentration may lie in the range 0.1 ppm to 5,000 ppm. The vitreous matrix is then made of silica doped with aluminum and germanium oxides.

The wavelength of the signal lies in the range 1.5 $\mu$m to 1.6 $\mu$m, and the pumping wavelength lies in the range 1.48 $\mu$m to 0.98 $\mu$m.

In a particular embodiment, said mirror is situated at that end of said section of amplifying fiber which is not bonded to said fiber.

Other characteristics and advantages of the present invention will appear on reading the following description of embodiments given by way of non-limiting example.

Figure 1:
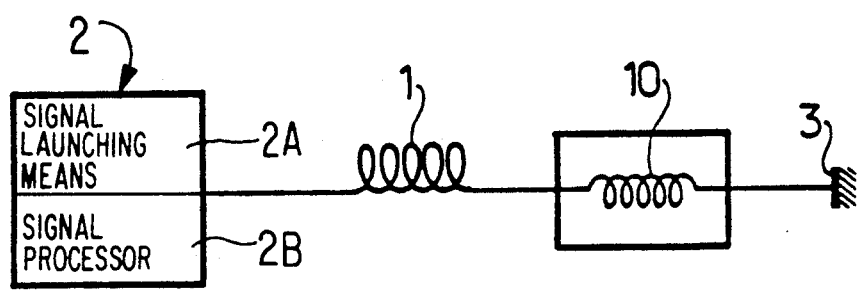
FIG. 1 is a very simplified schematic diagram of a sensor of the invention.

FIG. 1 shows a non-doped conventional optical fiber, reflective mirror 3 and an electronic device 2 including an optical signal launching means 2A,2A for launching a signal into the optical fiber and an optical signal processor 2B for processing the A section 10 of erbium-doped amplifying optical fiber is interposed in the optical line, is bonded to the fiber 1, and is associated with a 1.48 $\mu$m pump optical source, of signal launching means 2A such as a diode (not shown).

First assumption: the pumping power of the section 10 is zero.

If P(dBm) is the power of a signal launched by the device 2, then the power $P_s$ of the signal detected is such that:

$$P_s = P - \alpha - \beta$$

where:
  $\alpha$ represents the losses (in dB) in the fiber 1 over the out-and-back path; and
  $\beta$ represents the losses (in dB) in the section 10 over the out-and-back path.

Second assumption: the pumping power enables amplification to be performed in the section 10.

$P'_s$ is the power of the signal detected with the same launched signal power P:

$$P'_s = P - \alpha + G$$

where:
  G represents gain (in dB) in the section 10 over the entire out-and-back path.

The ratio between the two powers $P'_s$ and $P_s$ (or the difference between their logarithms) is such that $$P'_s - P_s = G + \beta.$$

G and $\beta$ are dependent on temperature. When the temperature rises, $\beta$ and G fall together. By processing $P'_s - P_s$, it is therefore possible to achieve good sensor temperature-sensitivity.

By way of example, the characteristics of the section 10 of the doped fiber are as follows:
  vitreous matrix: silica co-doped with aluminum and germanium oxides;
  index difference between the core and the cladding: $28.5 \times 10^{-3}$;
  core radius: 1.34 $\mu$m; and
  length: 10 meters.

For a signal close to 1.53 $\mu$m, $\beta$ varies from 3.6 dB/m at $-40°$ C. to 2.8 dB/m at $+240°$ C.

For a 1.533 $\mu$m signal, and a pumping power of about 22 mW in the region of 1.48 $\mu$m, the net gain G varies from 29 dB at $-60°0$ C. to 8 dB at $+240°$ C. for a signal power P of about $-35$ dBm.

The structure of an intrinsic sensor of the invention enables it to convey signals having power that is high relative to existing sensors.

The temperature rating of the sensor is limited solely by the temperature rating of the covering on the fibers comprising it. If the covering is made of carbon, then the limit temperature can be as high as 600° C.

Such a sensor may also be used at low temperatures, down to $-200°$ C.

Such a sensor has the dimensions of an optical fiber and can withstand the same highly-disturbed environmental conditions as conventional fibers.

Figure 2:
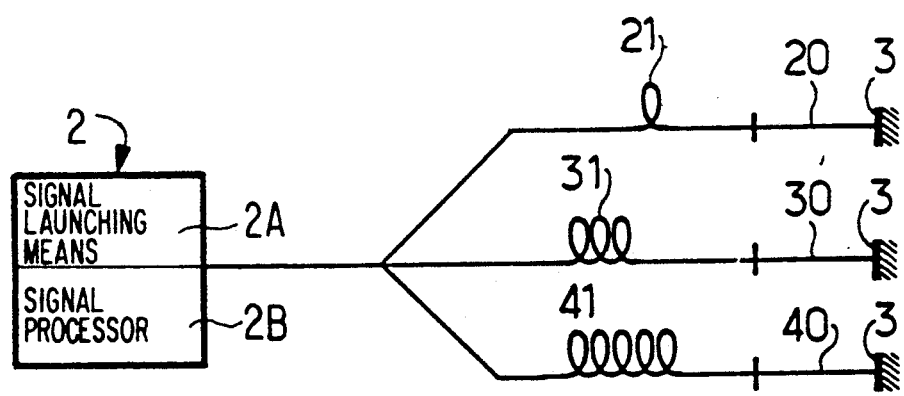
FIG. 2 is a very simplified schematic diagram of a network of sensors of the invention.

As shown in FIG. 2, a sensor of the invention enables a network of sensors to be made easily. Three sensors are shown, with conventional fibers 21, 31, 41 connected to respective sections of amplifying fiber 20, 30, 40.

The sensors are all connected to the electronic device 2 for launching signals and for receiving data.

The sensors are interrogated simultaneously, but the fibers 21, 31, 41 constitute delay lines so that the replies from the sensors are offset in time.

By way of example, the data may be processed by using the method used for backscattering measurements (OTDR).

In the above, the received signal is interpreted so as to measure a local or a mean temperature.

In another interpretation method suited to a sensor having a very long section of low-doped amplifying fiber, a point subjected to a large variation in temperature can be located. To do this, the backscattering curve of the amplified signal is analyzed, and it is possible to detect the large variations in a local gain in the amplifying fiber, i.e. the large variations in a local temperature.

Naturally, the invention is not limited to sensors equipped with a section of amplifying fiber that is doped with erbium. Any other rare-earth element providing such amplification may be considered.

We claim:

1. An optical fiber temperature sensor comprising;
    a light pump source for launching an optical signal,
    an optical fiber coupled to said light pump source and conveying said signal from said light pump and a retro back scattered signal to a signal processor,
    a section of optical fiber doped with erbium bonded to said optical fiber for amplifying said signal,
    a mirror bonded to said section of doped optical fiber for reflecting said optical signal back through said section, and said signal processor being bonded to said optical fiber and to said light pump source for comparing the powers of the launched optical signal and the retrobackscattered signal, previously amplified and previously not amplified respectively, by said section, and wherein the wave length of said optical signal lies in the range of 1.5 $\mu$m to 1.6 $\mu$m, and the wave length of the pumping signal line lies in the range of 1.48 $\mu$m to 0.98 $\mu$m.

2. A temperature sensor according to claim 1, characterized by the fact that said mirror is situated at that end of said section of amplifying fiber which is not bonded to said fiber.

3. A temperature sensor according to claim 1, characterized by the fact that the length of said section of amplifying fiber lies in the range 10 cm to 1 km.

4. A temperature sensor according to claim 3, characterized by the fact that the erbium concentration in said section of amplifying fiber lies in the range 0.1 to 5,000 ppm.

5. A temperature sensor according to claim 2, characterized by the fact that the vitreous matrix of said section of amplifying fiber is made of silica doped with aluminum and germanium oxides.

* * * * *